United States Patent [19]

Fowler

[11] Patent Number: 4,767,633

[45] Date of Patent: Aug. 30, 1988

[54] METHOD AND APPARATUS FOR HANDLING AND PROCESSING FOOD PIECE SLICES

[75] Inventor: David P. Fowler, Irving, Tex.

[73] Assignee: Frito-Lay, Inc., Dallas, Tex.

[21] Appl. No.: 879,428

[22] Filed: Jun. 27, 1986

Related U.S. Application Data

[63] Continuation-in-part of Ser. No. 713,896, Mar. 20, 1985, which is a continuation-in-part of Ser. No. 544,971, Oct. 24, 1983, abandoned.

[51] Int. Cl.⁴ .............................................. A23L 1/27

[52] U.S. Cl. .................................... 426/270; 426/321; 426/518; 99/534; 99/537; 83/98; 83/99

[58] Field of Search ...................... 426/270, 321, 518; 99/537, 450.1, 516, 534; 83/98, 99, 155

[56] References Cited

U.S. PATENT DOCUMENTS

| | | | |
|---|---|---|---|
| 2,148,922 | 2/1939 | Bachofner | 83/98 |
| 2,541,859 | 2/1951 | Callaghan et al. | 426/640 |
| 2,901,359 | 8/1959 | Forkner | 426/270 |
| 3,139,130 | 6/1964 | Urschel et al. | 83/417 |
| 3,245,300 | 4/1966 | Hasten et al. | 99/537 |
| 3,881,035 | 4/1975 | Tate | 426/518 |
| 4,006,257 | 2/1977 | Kolk | 426/270 |
| 4,184,423 | 1/1980 | Raque et al. | 99/537 |
| 4,251,555 | 2/1980 | Kroenig | 83/365 |
| 4,372,184 | 2/1983 | Fisher et al. | 83/98 |
| 4,514,428 | 4/1985 | Glass et al. | 426/321 |
| 4,547,376 | 10/1985 | Silver et al. | 426/270 |

FOREIGN PATENT DOCUMENTS

| | | | |
|---|---|---|---|
| 3222846 | 1/1983 | Fed. Rep. of Germany | 99/537 |

OTHER PUBLICATIONS

Grote brochure, Gahanna Parkway, Blacklick, Columbus, Ohio.

Knight, Katherine et al, "Browning of Frozen Apples Prevented", Food Industries, Dec. 1949, pp. 63-65.

*Primary Examiner*—David L. Lacey
*Assistant Examiner*—V. Manoharan
*Attorney, Agent, or Firm*—Bernard, Rothwell & Brown

[57] ABSTRACT

Food piece slices serially formed by the blade of a slicer are captured with a moving stream of liquid and carried in the moving stream of liquid during free-fall of the liquid under the influence of gravity to a moving conveyor belt where the slices are monolayered.

10 Claims, 2 Drawing Sheets

METHOD AND APPARATUS FOR HANDLING AND PROCESSING FOOD PIECE SLICES

CROSS-REFERENCE TO RELATED APPLICATIONS

This is a continuation-in-part of copending U.S. patent application Ser. No. 713,896, filed Mar. 20, 1985, pending, which was a continuation-in-part of U.S. patent application Ser. No. 544,971, filed Oct. 24, 1983, now abandoned.

BACKGROUND OF THE INVENTION

1. Field of the Invention

The present invention relates to slicing food pieces and handling and processing of food piece slices after slicing.

2. Description of the Background Art

High speed automated devices for slicing food pieces, such as potatoes and the like, are known in the art. One such apparatus is the Urschel Model CC, commonly utilized to slice potatoes in the commercial production of potato chips. The Urschel Model CC includes a stationary drum with peripherally mounted knives and a rotating impeller within the drum. Food pieces, such as potatoes, are fed into the drum and forced against the peripherally mounted knives by the impeller with the slices exiting the periphery of the drum. Such drum-type slicers are efficient, and are useful for producing slices which are processed after slicing as a group to form the final product, such as washing and frying of a mass of potato slices in the production of potato chips. However, due to the manner in which slices exit the periphery of the drum upon slicing, such drum-type slicers are not particularly useful for forming slices which must be separated after slicing for further processing, such as monolayering apple slices for processing into apple chips.

For slicing elongate food pieces, such as sticks of salomi, bricks of cheese or loaves of bread, another slicing approach has been utilized by the J. E. Grote Company, Inc. of Ohio. This approach utilizes a stationary horizontal slicing table, above which projects a slicing blade at a slight angle with respect to the plane of the table. A vertically oriented pivoting guide tube carries the food pieces to be sliced above the slicing table and blade, the guide tube including a feed outlet which is reciprocated past the upwardly extending blade to slice the food pieces at the feed outlet. The slice thickness is determined by the distance the blade extends above the slicing table, the slices dropping by gravity from the slicing blade through a slot in the slicing table adjacent the slicing blade. Grote TM slicers have been utilized to monolayer relatively thick slices of elongate food pieces by passing a conveyor beneath the slicing table onto which the slices individually fall. However, difficulties are encountered when attempting to monolayer extremely thin slices (such as apple slices for apple chips) sliced with Grote-type slicers because such slices are lightweight, soft and highly flexible.

When forming apple slices in the production of apple chips, it is desirable to coat the surfaces of the apple slices with an aqueous solution of anti-browning agent as soon as possible after slicing. However, if the anti-browning solution is applied after monolayering the slices on a porous conveyor belt for further processing such as drying, it is only practicable to apply solution to the upper surfaces of the slices so as not to destroy the monolayer.

There thus remains a need in the art for a method for monolayering slices while coating all surfaces of the slices with solution.

SUMMARY OF THE INVENTION

In accordance with the present invention, a method is provided for conveying a food slice from a slicer to a moving conveyor belt while flooding all the surfaces of the slice with liquid. The slicer includes at least one slicing blade which serially slices a food piece into slices, the slices falling away from the blade upon slicing. The method comprises capturing a falling slice with a moving stream of liquid, and carrying the slice in the moving stream of liquid, during free-fall of the liquid under the influence of gravity, to a moving conveyor belt. The invention further relates to an apparatus for slicing a food piece and for handling the food piece utilizing the above-described method.

DETAILED DESCRIPTION OF THE PREFERRED EMBODIMENTS

The present invention is applicable to food piece slicers, and will be further described with reference to a slicer having a slicing blade projecting above a horizontal slicing table over which a food piece is passed with slices falling away from the blade through a slit in the table. Such slicers include the Grote TM Model 522 or other 500 series slicers manufactured by J. E. Grote Company, Inc. of Blacklick, Ohio.

Figure 1:
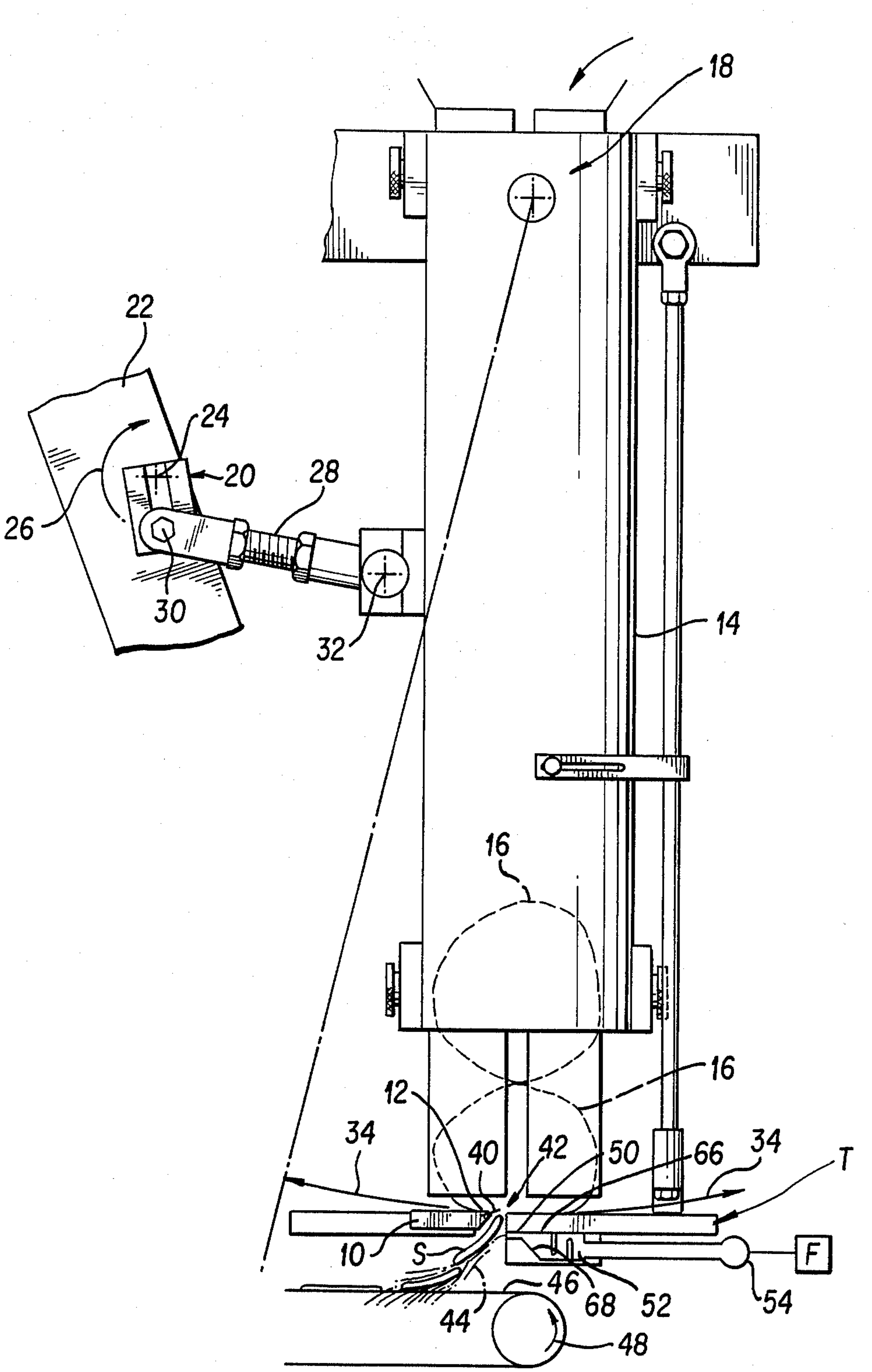
FIG. 1 is a side elevation view, partly schematic of an apparatus for carrying out the method of the invention.

FIG. 1 illustrates application of the invention utilizing a Grote TM 500 series slicer. The slicer includes a stationary horizontal slicing table T, the table T having a blade guide portion 10 supporting a slicing blade 12.

The slicer further includes a pivotably mounted, reciprocating, generally vertical guide tube or chute 14 within which is guided food pieces such as apples 16 to be sliced. Tube 14 is pivotably connected at its upper end at pivot 18. The lower end of guide chute 14 is reciprocated back and forth past the slicing blade 12 by means including a rotating arm 20 supported by arm support 22. Rotating arm 20 is rotated about an axis 24 in the direction shown by arrow 26 by any suitable means such as a hydraulic motor (not shown). One end of an adjustable connecting rod 28 is connected to rotating arm 20 at pivot 30, and the other end of rod 28 is connected to guide chute 14 at pivot 32 for reciprocal motion of guide tube 14 about pivot 18 in the directions of double-ended arrow 34.

Figure 2:
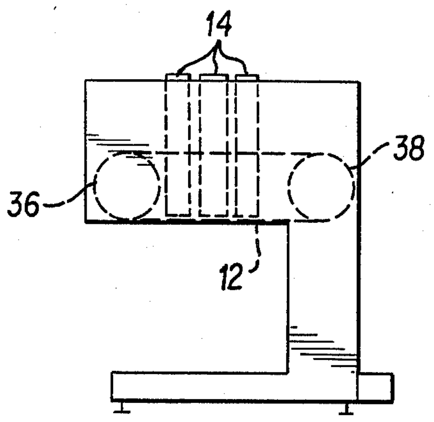
FIG. 2 is a front elevation view of a slicer suitable for use with the invention.
Figure 3:
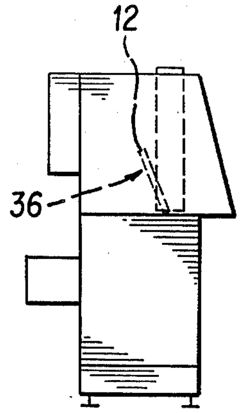
FIG. 3 is a side elevation view of the slicer shown in FIG. 2.
Figure 4:
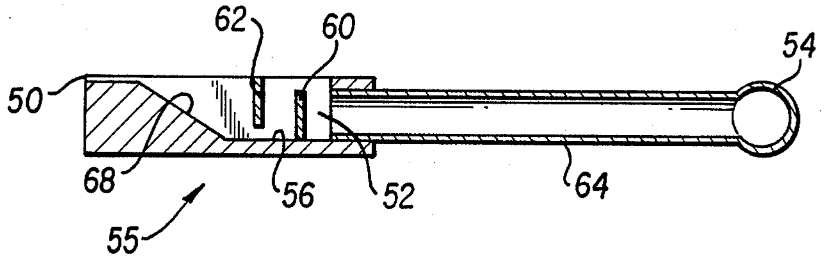
FIG. 4 is a cross-sectional view of a lower body portion of a liquid chamber for providing a moving stream of fluid according to the invention.
Figure 5:
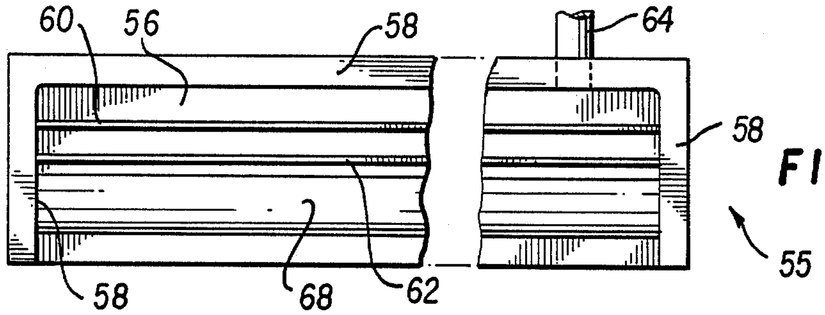
FIG. 5 is an elevational view of the liquid chamber portion shown in FIG. 4 with portions broken away.
Figure 6:
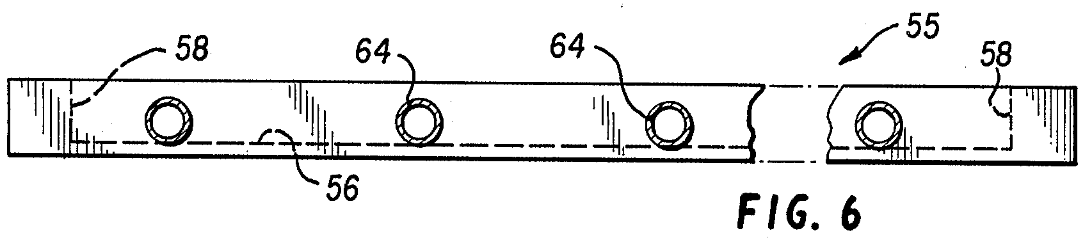
FIG. 6 is a rear elevation view of the liquid chamber portion shown in FIG. 5 with portions broken away.

Advantageously, a plurality of guide chutes 14 are arranged side-by-side and reciprocated as a group past a single slicing blade 12. See FIG. 2. As shown in FIGS. 2 and 3, slicing blade 12 in a Grote-type slicer is an endless loop passing around blade pulley 36 and drive pulley 38. As drive pulley 38 is rotated by an electric drive motor (not shown), blade 12 is rapidly passed through the blade guide portion 10 of slicing table T at a slight angle (compare FIGS. 1 and 3). An edge portion 40 of blade 12 extends above the plane defined by table T a distance corresponding to the thickness of a slice of the food product.

Reciprocation of tube 14 past blade 12 serially slices a food piece such as apple 16, the serially formed slices falling away from blade 12 through a slit passageway 42 in slicing table T.

Figure 7:
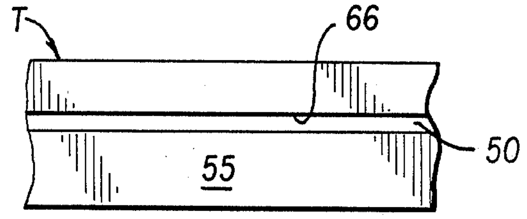
FIG. 7 is a front elevational view of the slotted baffle chamber shown in FIG. 1, with portions broken away.

In accordance with the present invention, an elongate moving curtain 44 of liquid is formed, at least a portion of which curtain is free-flowing unsupported by a surface and free from surface contact as shown in FIG. 1. The slices falling away from blade 12 are captured in the moving stream 44 of liquid so that the slice first contacts the liquid in the free-falling unsupported portion thereof as illustrated in FIG. 1. The slices are carried in the moving stream of liquid during free-fall of the liquid under the influence of gravity to a conveyor belt 46 moving in the direction of arrow 48, where the slices are deposited in a monolayer. The moving stream of liquid exits a linear, longitudinal slot 50 beneath the slicing blade 12 as an elongate curtain of liquid, slot 50 thereby providing means for forming an elongate curtain of liquid. See FIGS. 1 and 7. The longitudinal slot is positioned beneath the slicing blade in parallel relationship thereto. Liquid is delivered to slot 50 from a liquid source F by means including a baffled chamber 52 and a liquid distribution manifold 54. See FIGS. 1 and 4–6.

Chamber 52 is defined by a lower chamber body portion 55 defining the floor 56, sidewalls 58 and baffles 60, 62 of chamber 52. A ceiling surface 66 of chamber 52 is defined by a lower surface of table T to which chamber body portion 55 is attached by any suitable means, such as welding. The lower chamber portion 55 is connected to the lower surface of table T adjacent slit 42. Tubing 64 connects the liquid distribution manifold 54 for passage of liquid to chamber 52. Baffles 60 and 62 stabilize the flow of liquid through slot 50 to form a substantially uniform curtain of liquid exiting the slot. The baffle arrangement includes a first barrier wall portion 60 between manifold 54 and slot 50 which extends upwardly from the floor portion 56 of the chamber but does not contact the ceiling portion 66 of the chamber defined by the bottom surface of table T. A second barrier wall portion 62 is located between the barrier portion 60 and slot 50, and extends downwardly from the ceiling portion 66 of the chamber but does not contact the floor portion 56 of the chamber. The baffled chamber further includes a ramp portion 68 extending between the floor portion 56 of the chamber and slot 50.

For forming apple slices in the production of dried apple chips, an anti-browning solution containing sodium bisulfite is utilized to form the moving curtain of liquid. Slot 50 is positioned beneath slicing blade 12 to allow the anti-browning solution to initially contact an underside of an apple slice serially formed by reciprocation of guide chute 14 paste blade 12. The slice then is captured in the falling curtain of liquid and the slice carried with the moving stream of liquid during free-fall of the liquid under the influence of gravity onto the moving porous conveyor belt 46 on which the slices are deposited in a monolayered fashion. All surfaces of the slices are bathed in the liquid during this transfer. Conveyor 46 is a porous conveyor, such as a "chain-link" conveyor, permitting the liquid to pass through as the slices are deposited and serially monolayered on the moving endless conveyor belt. The present invention provides for efficient monolayering of food piece slices on a moving conveyor belt while flooding all surfaces of a slice with liquid. The slices thereafter can be further processed, e.g., by radiant heat drying, to form apple chips.

The present invention is also applicable to slicers having a blade fixedly mounted on a reciprocating slicing table which reciprocates past a stationary food piece guide chute to effect slicing of a food piece.

Since many modifications, variations and changes in detail may be made to the described embodiments, it is intended that all matter in the foregoing description and shown in the accompanying drawings be interpreted as illustrative and not in a limiting sense.

I claim:

1. A food piece slicing and handling method, comprising:

(a) forming an elongate moving curtain of liquid at least a portion of which is free-falling unsupported by a surface and free from surface contact;

(b) serially forming separate slices of a food piece by moving the food piece against a sliding blade;

(c) capturing a serially formed slice with the moving curtain of liquid so that the slice first contacts the liquid in the free-falling unsupported portion thereof;

(d) carrying the slice with the moving curtain of liquid during free-fall of the liquid under influence of gravity to a moving porous conveyor belt; and (e) depositing the slice on the moving conveyor belt with the liquid.

2. The method of claim 1 wherein the food piece is an apple and the liquid is an anti-browning solution.

3. The method of claim 2 wherein the solution is a sodium bisulfite solution.

4. The method of claim 1 wherein during the capturing step, the moving curtain of liquid initially contacts an underside of a serially formed slice.

5. The method of claim 1 wherein the moving curtain of liquid exits a linear, longitudinal slot beneath the slicing blade.

6. The method of claim 5 wherein the food piece is sliced parallel with the longitudinal slot during serial formation of said separate slices.

7. The method of claim 1 wherein the depositing step includes the step of serially monolayering the slices on the moving conveyor belt.

8. An apparatus for slicing and handling a food piece comprising:

a slicing blade;

means for moving a food piece against the slicing blade to serially form separate slices of the food piece;

means for forming an elongate moving curtain of liquid at least a portion of said curtain is free-falling unsupported by a surface and free from surface contact, including a linear, longitudinal slot positioned beneath the slicing blade; a chamber means for connecting said slot with a source of liquid; baffle means in the chamber for stabilizing flow of liquid through the slot to form a substantially uniform curtain of liquid exiting the slot; and a moving porous conveyor belt on which the slices are deposited and monolayered; wherein the free-falling unsupported portion of the liquid curtain is positioned adjacent the cutting blade so as to capture the serially formed slices such that the slices first contact the liquid in the free-falling unsupported portion thereof, and wherein the slices are carried with the moving curtain of liquid, during free-fall of the liquid under influence of gravity, to said moving conveyor belt.

9. The apparatus of claim 8 further including a liquid distribution manifold connecting the chamber with a liquid source, wherein the baffle means comprise a first barrier portion between the manifold and the slot, the first barrier portion extending upwardly from a floor portion of the chamber but not contacting a ceiling portion of the chamber, the baffle means further comprising a second barrier portion between the first barrier portion and the slot, the second barrier portion extending downwardly from the ceiling portion of the chamber but not contacting the floor portion of the chamber.

10. The apparatus of claim 9 wherein the baffled chamber further includes a ramp portion extending between the floor of the chamber and said slot.

* * * * *